United States Patent
Kaifu et al.

(10) Patent No.: US 8,707,771 B2
(45) Date of Patent: Apr. 29, 2014

(54) AIRFLOW MEASURING DEVICE

(71) Applicant: Denso Corporation, Kariya (JP)

(72) Inventors: Teruaki Kaifu, Kariya (JP); Yasushi Kohno, Obu (JP)

(73) Assignee: Denso Coporation, Kariya (JP)

( * ) Notice: Subject to any disclaimer, the term of this patent is extended or adjusted under 35 U.S.C. 154(b) by 0 days.

(21) Appl. No.: 13/707,706

(22) Filed: Dec. 7, 2012

(65) Prior Publication Data
US 2013/0192354 A1    Aug. 1, 2013

(30) Foreign Application Priority Data
Jan. 26, 2012 (JP) ................................. 2012-013626

(51) Int. Cl.
*G01M 15/02*    (2006.01)

(52) U.S. Cl.
USPC ................... 73/114.32; 73/114.34; 73/204.21

(58) Field of Classification Search
USPC .............................. 73/114.32, 114.34, 204.21
See application file for complete search history.

(56) References Cited

U.S. PATENT DOCUMENTS

| | | | | |
|---|---|---|---|---|
| 7,654,134 B2* | 2/2010 | Enomoto et al. | ............ | 73/114.32 |
| 7,665,351 B2* | 2/2010 | Kamiya | ...................... | 73/114.32 |
| 7,946,158 B2* | 5/2011 | Enomoto et al. | ............ | 73/114.32 |
| 8,347,706 B2* | 1/2013 | Okamoto et al. | ............ | 73/202.5 |
| 8,590,368 B2* | 11/2013 | Kitahara | ...................... | 73/114.32 |
| 2008/0307867 A1 | 12/2008 | Enomoto et al. | | |
| 2008/0307868 A1* | 12/2008 | Kitahara | ...................... | 73/114.32 |
| 2008/0307869 A1* | 12/2008 | Kamiya | ...................... | 73/114.32 |
| 2012/0103086 A1* | 5/2012 | Goka et al. | ................. | 73/204.26 |
| 2012/0291519 A1* | 11/2012 | Kitahara | ......................... | 73/1.16 |
| 2012/0291533 A1* | 11/2012 | Kitahara | ..................... | 73/114.32 |
| 2013/0014573 A1* | 1/2013 | Kamiya et al. | ............. | 73/114.32 |
| 2013/0019675 A1* | 1/2013 | Ban et al. | ......................... | 73/202 |
| 2013/0055800 A1* | 3/2013 | Kitahara et al. | ............ | 73/114.32 |
| 2013/0055801 A1* | 3/2013 | Kohno et al. | .............. | 73/114.34 |
| 2013/0105137 A1* | 5/2013 | Kohno et al. | .................. | 165/287 |

FOREIGN PATENT DOCUMENTS

| | | | |
|---|---|---|---|
| JP | 2008309614 A | | 12/2008 |
| JP | 2010-261771 A | | 11/2010 |
| JP | 2011-220836 A | | 11/2011 |

OTHER PUBLICATIONS

Office Action issued Jan. 14, 2014 in corresponding JP Application No. 2012-013626 (with English translation).

\* cited by examiner

*Primary Examiner* — Freddie Kirkland, III (57) ABSTRACT

A first passage has a branch position where a second passage is branched from the first passage to move air along a reference vector. The second passage accommodates a thermal sensor. The first passage has a throttle at a downstream of the branch position. The throttle has a throttle wall surface having a normal vector directed inwardly. A width direction is perpendicular to both a flow direction of air in the throttle and the reference vector. The throttle wall surface has a specific region, in which the normal vector includes a vector component in the width direction, and an angle θ between the normal vector and the reference vector is in a range of 90 degrees<θ<180 degrees.

8 Claims, 11 Drawing Sheets

WIDTH DIRECTION

WIDTH DIRECTION

AIRFLOW MEASURING DEVICE

CROSS REFERENCE TO RELATED APPLICATION

This application is based on reference Japanese Patent Application No. 2012-13626 filed on Jan. 26, 2012, the disclosure of which is incorporated herein by reference.

TECHNICAL FIELD

The present disclosure relates to an airflow measuring device configured to measure a flow rate of air.

BACKGROUND

Conventionally, a known thermal-type airflow measuring device is employed for measuring a flow rate of air by utilizing heat transfer with air. Such a conventional airflow measuring device is, for example, equipped to a duct, which forms an air intake passage of an internal combustion engine, for measuring a flow rate (intake air amount) of intake air drawn into the internal combustion engine.

Such an airflow measuring device includes a case and a sensor. The case is equipped to a duct such that the case is projected into the duct for receiving a part of intake air flowing though the duct. The sensor is accommodated in the case and is configured to conduct heat transfer with the intake air received in the case and to send an electric signal correspondingly to the intake air amount in the duct. For example, JP-A-2008-309614, which corresponds to Publication of US Patent Application No. 20080307867, discloses an airflow measuring device having a configuration to protect the sensor from damage caused by collision with dust entering into the case.

Specifically, the case has a first passage and a second passage. The first passage draws intake air from the duct and exhausts the drawn intake air into the duct. The second passage branches from the first passage. The second passage draws intake air from the first passage and exhausts the drawn intake air into the duct separately from the first passage. The sensor is accommodated in the second passage. The first passage has a throttle at the downstream of a branch position where the second passage is branched from the first passage. The first passage exhausts intake air into the duct, while throttling the intake air at the throttle. The present configuration enables to apply inertial force on dust, which enters into the first passage, to move the dust toward the throttle thereby and to cause the dust to collide against the wall surface (throttle wall surface.) of the throttle to return the dust into the duct. Thus, the dust is restricted from entering the second passage.

Furthermore, in the airflow measuring device of JP-A-2008-309614, the throttle wall surface is formed such that dust, which once moves into the throttle, collides against the throttle wall surface thereby to be restricted from moving, i.e., reentering backward into the second passage.

Figure 11A:
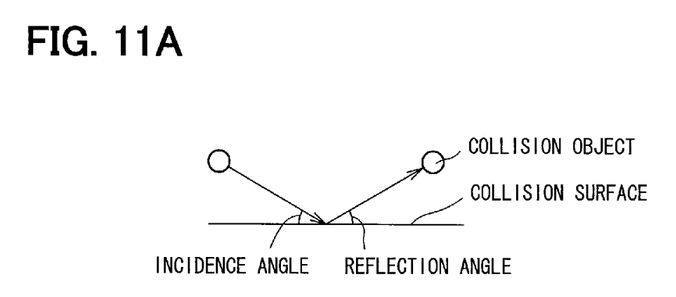
FIG. 11A is an explanatory view showing an ideal collision.

In the airflow measuring device of JP-A-2008-309614, the throttle wall surface is formed on the assumption that collision of dust is an ideal collision described as follows. As shown in FIG. 11A, the ideal collision is a collision mode in which the incidence angle of a collision object relative to a collision surface substantially coincides with the reflection angle of the collision object relative to the collision surface. It is considered that, as the shape of a collision object becomes, for example, spherical, the collision mode becomes the ideal collision.

Figure 11B:
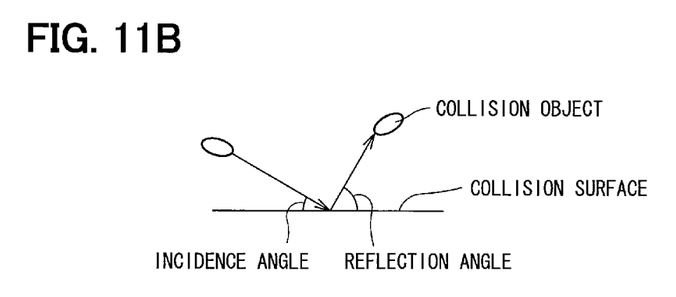
FIG. 11B is an explanatory view showing a nonideal collision.

However, dust is in various shapes and is not necessarily in a spherical shape. Therefore, the collision mode of dust relative to the throttle wall surface is not necessarily the ideal collision. As shown in FIG. 11B, the collision mode of dust may become nonideal collision in which the incidence angle does not substantially coincide with the reflection angle. Therefore, even in a configuration in which the throttle wall surface is formed to restrain reentrance of dust on the assumption of the ideal collision, the reentrance of dust may not be effectively restrained. Thus, in order to protect the sensor from damage due to collision with dust, it is necessary to form the throttle wall surface in consideration of the nonideal collision.

SUMMARY

It is an object of the present disclosure to produce an airflow measuring device including a sensor, which is configured to be reliably protected from damage due to collision with dust.

According to an aspect of the present disclosure, an airflow measuring device comprises a case protruded in a duct and configured to receive a part of air flowing through the duct. The airflow measuring device further comprises a sensor accommodated in the case, the sensor being configured to conduct heat transfer with air received in the case and to send an electric signal according to a flow amount of air in the duct. The case has a first passage configured to receive air from the duct and to exhaust air into the duct. The case further has a second passage branched from the first passage, the second passage configured to receive air from the first passage and to exhaust air into the duct separately from the first passage, the second passage accommodating the sensor. The first passage has a throttle at a downstream of a branch position where the second passage is branched from the first passage, the first passage is configured to exhaust air into the duct while throttling air at the throttle. The throttle has a throttle wall surface having a normal vector directed toward an inside of the throttle. The case has a reference cross section including the branch position, the reference cross section being perpendicular to a passage axis of the duct. The case is configured to move air along a flow-direction vector into the second passage at the branch position. The reference cross section includes a reference vector, which is formed by vertically projecting the flow-direction vector on the reference cross section. A width direction is perpendicular to both a flow direction of air in the throttle and the reference vector. The throttle wall surface has a specific region, in which the normal vector includes a vector component in the width direction, and an angle θ between the normal vector and the reference vector is in a range of 90 degrees<θ<180 degrees.

According to another aspect of the present disclosure, an airflow measuring device comprises a case protruded in a duct and configured to receive a part of air flowing through the duct. The airflow measuring device further comprises a sensor accommodated in the case, the sensor being configured to conduct heat transfer with air received in the case and to send an electric signal according to a flow amount of air in the duct. The case has a first passage configured to receive air from the duct and to exhaust air into the duct. The case further has a second passage branched from the first passage, the second passage configured to receive air from the first passage and to exhaust air into the duct separately from the first passage, the second passage accommodating the sensor. The first passage has a throttle at a downstream of a branch position where the second passage is branched from the first passage, the first passage is configured to exhaust air into the duct while throttling air at the throttle. The throttle has a throttle wall surface having a normal vector directed toward an inside of the throttle. The case is configured to move air along a reference vector into the second passage at the branch position. A width direction is perpendicular to both a flow direction of air in the throttle and the reference vector. The throttle wall surface has a specific region, in which the normal vector includes a vector component in the width direction, and an angle θ between the normal vector and the reference vector is in a range of 90 degrees<θ<180 degrees.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION (Embodiments)
(Configuration of First Embodiment)

Figure 1:
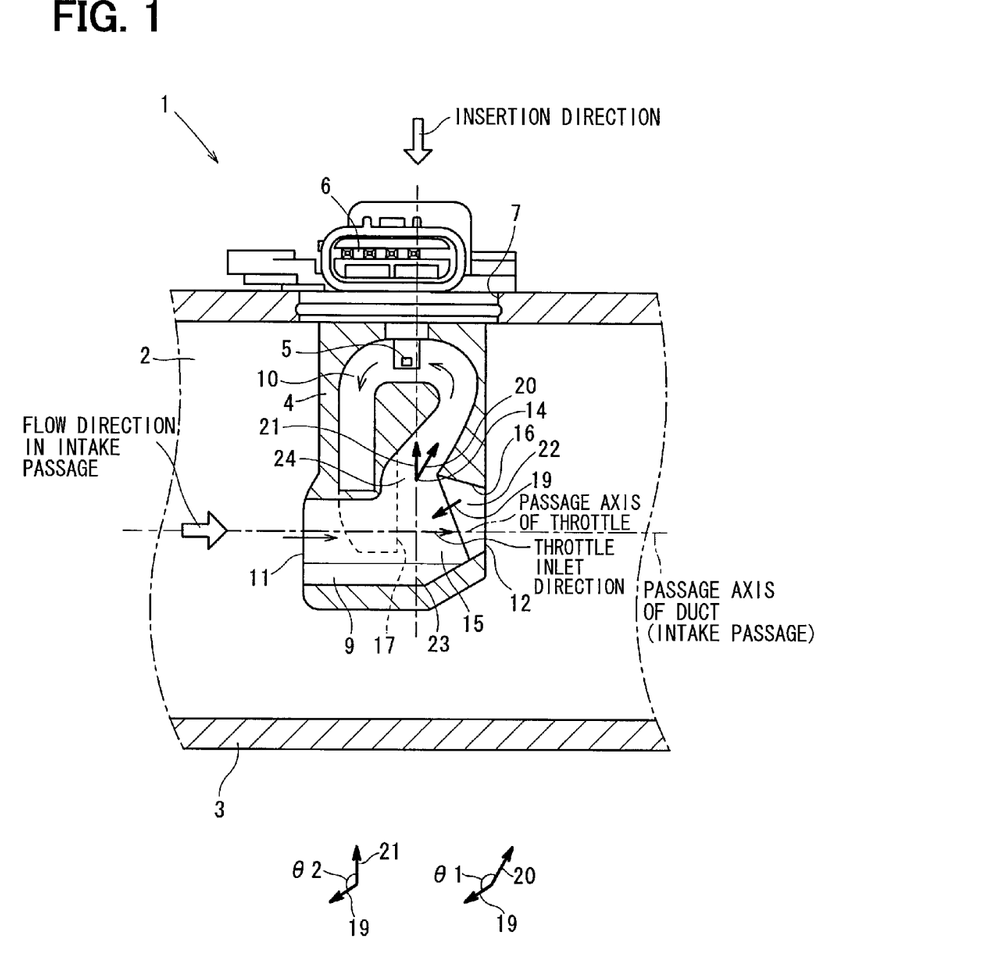
FIG. 1 is a schematic sectional view showing an airflow measuring device taken along a width-direction definition plane, according to a first embodiment.
Figure 2:
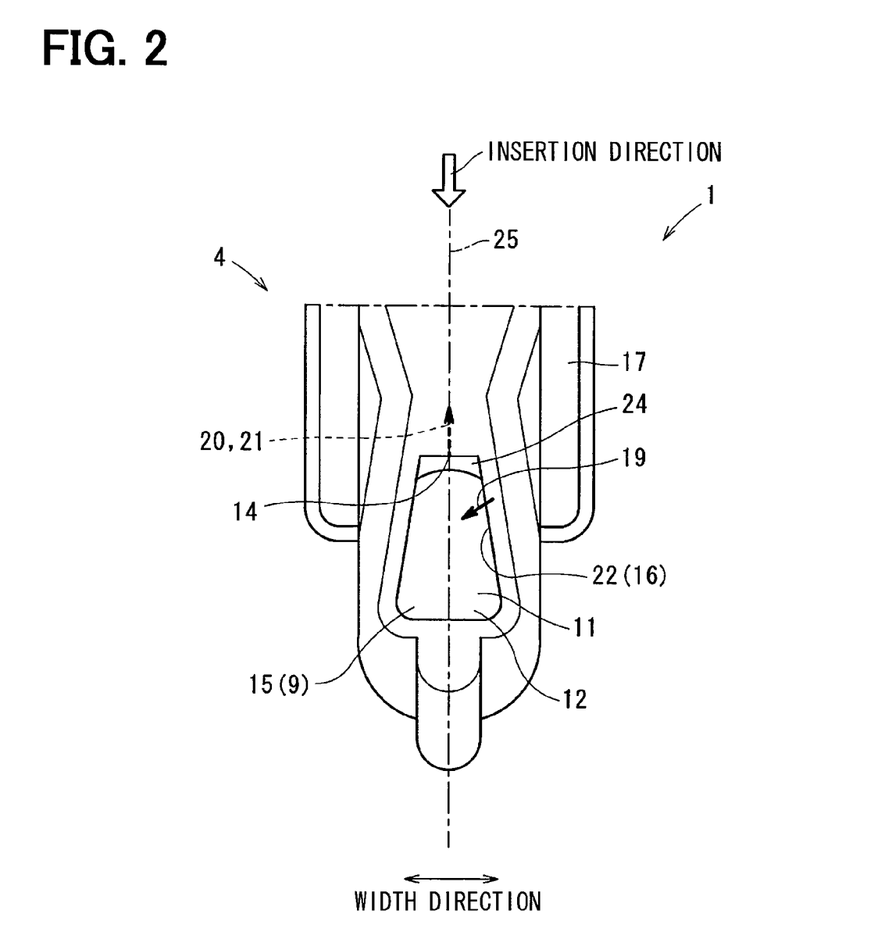
FIG. 2 is a schematic rear view showing the airflow measuring device according to the first embodiment.

Configuration of an airflow measuring device 1 according to the first embodiment will be described with reference to FIGS. 1 and 2. The airflow measuring device 1 has an internal heat transfer configuration to measure a flow rate, of air. The airflow measuring device 1 is equipped to, for example, a duct 3 defining therein an air intake passage 2 directed to an internal combustion engine (not shown) and configured to measure the flow rate of air (intake air amount) in the duct 3.

The airflow measuring device 1 includes a case 4, a sensor 5, and a connector 6. The case 4 is projected into the air intake passage 2 and is configured to draw a part of intake air flowing through the air intake passage 2. The sensor 5 is accommodated in the case 4 and is configured to conduct heat transfer with intake air thereby to send an electric signal related to the intake air amount. The connector 6 is used to transmit an electric signal to an external device. The duct 3 has an insertion hole 7, through which the case 4 is inserted into the duct 3 and projected into the air intake passage 2. The case 4 is linearly inserted through the insertion hole 7 and is fixed to the duct 3, thereby being arranged in a predetermined form in the air intake passage 2. The connector 6 is located outside the duct 3.

The case 4 is projected into the air intake passage 2 such that the case 4 is perpendicular to the axis of the air intake passage 2 in the duct 3. The case 4 has a first passage 9 and a second passage 10. The first passage 9 draws intake air from the air intake passage 2 and exhausts the drawn intake air into the air intake passage 2. The second passage 10 branches from the first passage 9. The second passage 10 draws intake air from the first passage 9 and exhausts the drawn intake air into the air intake passage 2 separately from the first passage 9. The sensor 5 is accommodated in the second passage 10.

More specifically, intake air drawn from an inlet port 11 flows into the first passage 9 linearly in one way. The intake air is exhausted from the first passage 9 into the air intake passage 2. The inlet port 11 opens toward the upstream of the air intake passage 2 perpendicularly to the intake air flow. The inlet port 11 is perpendicular to the passage axis of the air intake passage 2. The first passage 9 has a first exhaust port 12 opening toward the downstream of the air intake passage 2. The first exhaust port 12 opens perpendicularly to the intake air flow in the air intake passage 2. The first passage 9 has a throttle 15 at the downstream of a branch position 14 where the second passage 10 is branched from the first passage 9. The first passage 9 exhausts intake air into the air intake passage 2, while throttling the intake air at the throttle 15.

The present configuration applies inertial force to dust, which flows together with intake air from the inlet port 11, to direct the dust into the throttle 15, without allowing the dust to move into the second passage 10. The present configuration further returns the dust into the air intake passage 2, while causing the dust to collide against a throttle wall surface 16 of the throttle 15. The present configuration further guides the dust toward the throttle 15 thereby to protect the sensor 5 located in the second passage 10 from damage due to collision with the dust.

Dust flows from the first passage 9 together with intake air, and the dust once turns around through the second passage 10 to flow in the opposite direction from the flow direction of intake air in the air intake passage 2, temporarily. Thereafter, the dust again flows in the same direction as the intake air flow in the air intake passage 2. Thus, the dust is exhausted into the air intake passage 2. With the present configuration, the passage length of intake air flowing inside the case 4 is longer than the passage length of intake air flowing along the outside of the case 4 linearly. The second passage 10 branches into two passages at its downstream to have two second exhaust ports 17 (FIG. 2.). The two second exhaust ports 17 open toward the downstream of the air intake passage 2. The two second exhaust ports 17 open perpendicularly to intake air flow in the air intake passage 2.

The sensor 5 is located in the most bottom area of the second passage 10 and is located at the most distant position from the first passage 9. In the position where the sensor 5 is located in the second passage 10, intake air flows in the opposite direction from the flow direction of intake air in the air intake passage 2. The electric signal generated with the sensor 5 is processed in a predetermined way and is sent to an electronic control unit (not shown) outside the airflow measuring device 1. The electronic control unit utilizes the processed signal for various controls such as a fuel injection control.

In the above-described airflow measuring device 1, the sensor 5 is not located directly in the air intake passage 2 but is located in the second passage 10 inside the case 4. With the present configuration, the airflow measuring device 1 is enabled to obtain a detection result with a small fluctuation, without being exerted directly with an influence of turbulence of intake air passing through the air intake passage 2. In the airflow measuring device 1, the passage length inside the case 4 is larger than the passage length outside the case 4. With the present configuration, the airflow measuring device 1 is enabled to generate a high-precision detection signal, even when pulsation occurs in intake air flowing through the air intake passage 2.

(Feature of First Embodiment)

Further detailed configurations of the airflow measuring device 1 according to the first embodiment will be described with reference to FIGS. 1 to 4. A specific region 22 exists on the throttle wall surface 16 in the airflow measuring device 1. In the specific region 22, a normal vector 19 in each point on the throttle wall surface 16 and a first reference vector 20 have a specific relation therebetween, and the normal vector 19 in each point on the throttle wall surface 16 and a second reference vector 21 have a specific relation therebetween. The normal vector 19 is defined in a direction from each section (each point) on the throttle wall surface 16 into the throttle 15.

Figure 4:
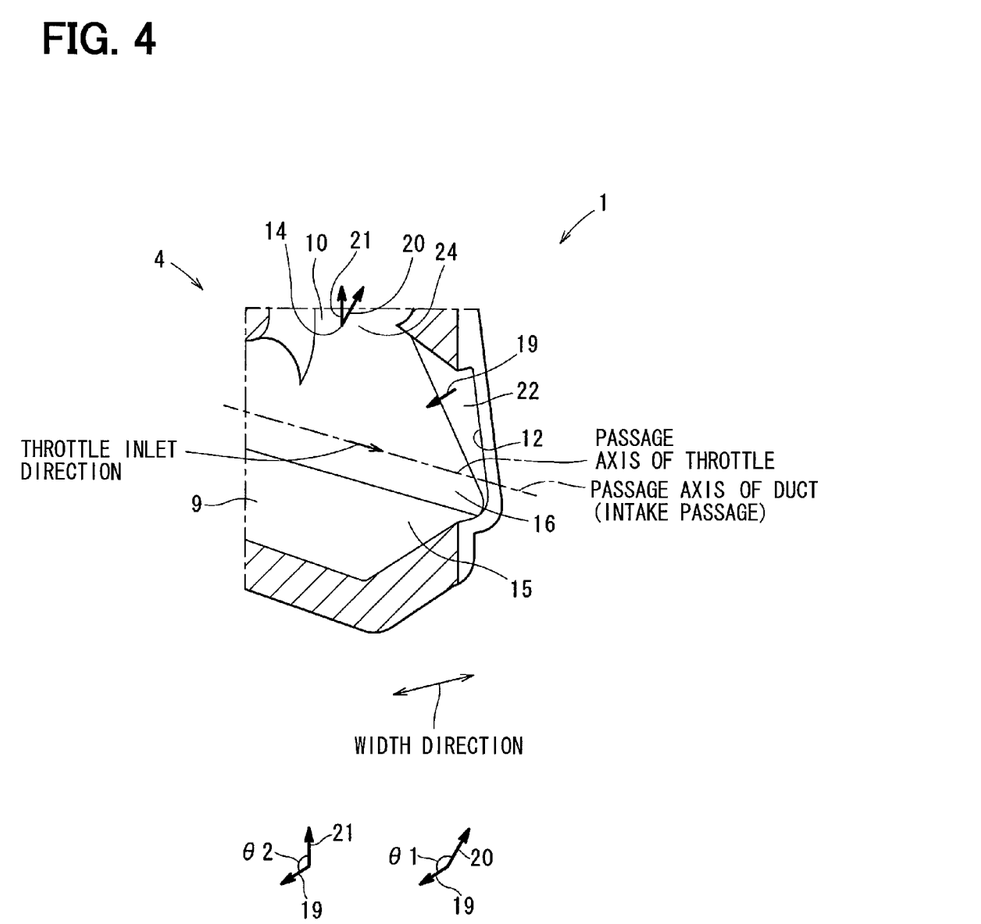
FIG. 4 is a perspective sectional view showing the inside of a throttle of the airflow measuring device taken along the width-direction definition plane, according to the first embodiment.

The first reference vector (flow-direction vector) 20 is defined in a direction along an airflow in the branch position 14 moving toward the second passage 10. The second reference vector 21 is defined as a projection vector of the first reference vector 20 vertically projected on a reference cross section 23.

The reference cross section 23 includes a cross section in the airflow measuring device 1. The cross section is perpendicular to the passage axis of the air intake passage 2 at the branch position 14. The second reference vector 21 is in parallel with an insertion direction, in which the case 4 is linearly inserted into the duct 3, and is opposite from the insertion direction. The following specific relation exists in the specific region 22 on the throttle wall surface 16. The specific region 22 continually diffuses on the throttle wall surface 16 such that the specific region 22 connects a brim of a branch port 24 of the second passage 10 with a brim of the first exhaust port 12.

The specific relation exists in the specific region 22 to satisfy the following conditions. Specifically, in the specific region 22, the normal vector 19 has a vector component in the width direction. In addition, in the specific region 22, an angle $\theta 1$, which is between the normal vector 19 and the first reference vector 20, and an angle $\theta 2$, which is between the normal vector 19 and the second reference vector 21, satisfy the following relations of 90 degrees<$\theta 1$<180 degrees and 90 degrees<$\theta 2$<180 degrees. More specifically, in the specific region 22, the angle $\theta 1$ and the angle $\theta 2$ may satisfy the following relations of 110 degrees<$\theta 1$<180 degrees and 110 degrees<$\theta 2$<180 degrees.

Figure 3:
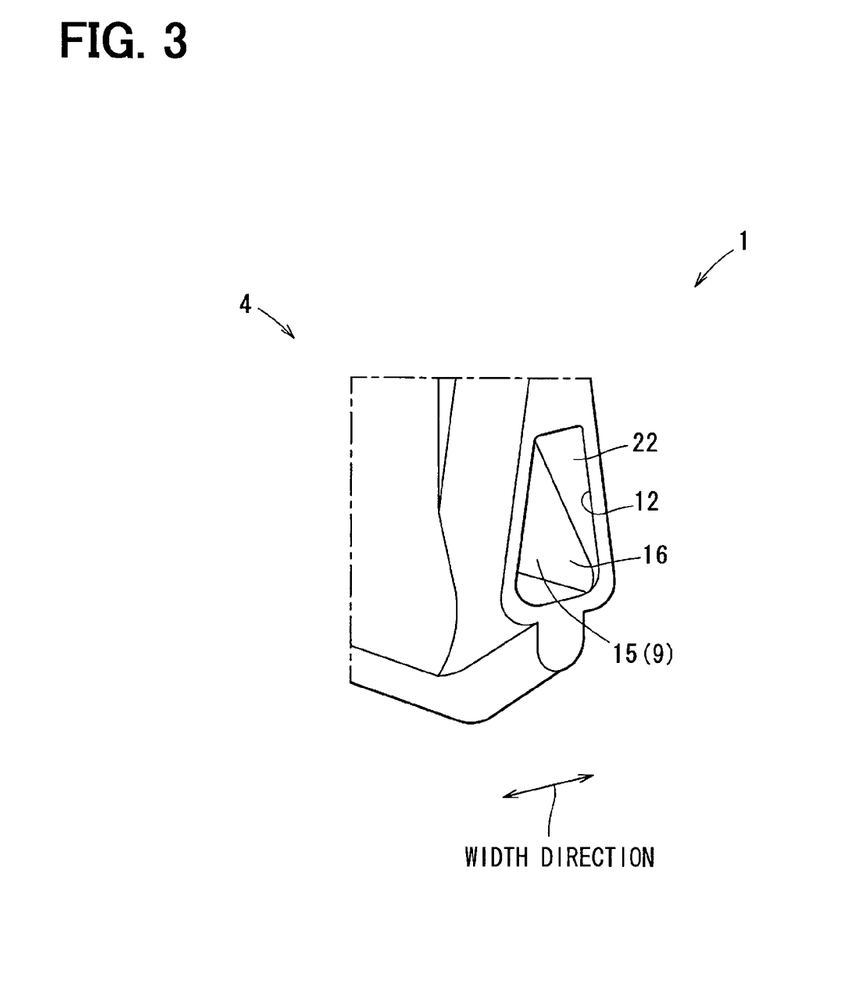
FIG. 3 is a partial perspective view showing a first exhaust port of the flow measuring device according to the first embodiment.

The width direction is perpendicular to a throttle inlet direction, in which intake air flows into the throttle 15, and a plane, which is in parallel with the first and second reference vectors 20 and 21. Referring to FIGS. 2 and 3, a width-direction definition plane 25 is in parallel with the throttle inlet direction and the first and second reference vectors 20 and 21. The width-direction definition plane 25 defines the width direction.

The plane in the specific region 22 is substantially entirely a flat surface. Furthermore, the normal vector 19 in the specific region 22 has vector components respectively in the direction, which is in parallel to the passage axis of the air intake passage 2 toward the upstream, and in the direction, which is opposite to the second reference vector 21, in addition to the vector component in the width direction. That is, the direction of the normal vector 19 in the specific region 22 can be broken down into three directions including the width direction, the direction, which is in parallel to the passage axis of the air intake passage 2 toward the upstream, and the direction, which is opposite to the second reference vector 21.

(Effect of First Embodiment)

According to the airflow measuring device 1 of the first embodiment, the normal vector 19 has a vector component in the width direction in the specific region 22 of the throttle wall surface 16. In addition, the angle $\theta 1$ is in the range of 90 degrees<$\theta 1$<180 degrees, and the $\theta 2$ is in the range of 90 degrees<$\theta 2$<180 degrees. With the present configuration, even in a case where dust moves into the throttle 15, the dust hardly reenters the throttle 15 after colliding against the surface in the specific region 22, irrespective of the collision against the specific region 22 is the ideal collision or the nonideal collision (FIGS. 11A and 11B). Therefore, the rate of dust reentering into the throttle 15 relative to entire dust moving into the throttle 15 can be reduced. Thus, reentrance of dust can be restrained in the airflow measuring device 1. Consequently, the sensor 5 can be reliably protected from damage caused by collision with dust.

Figure 5:
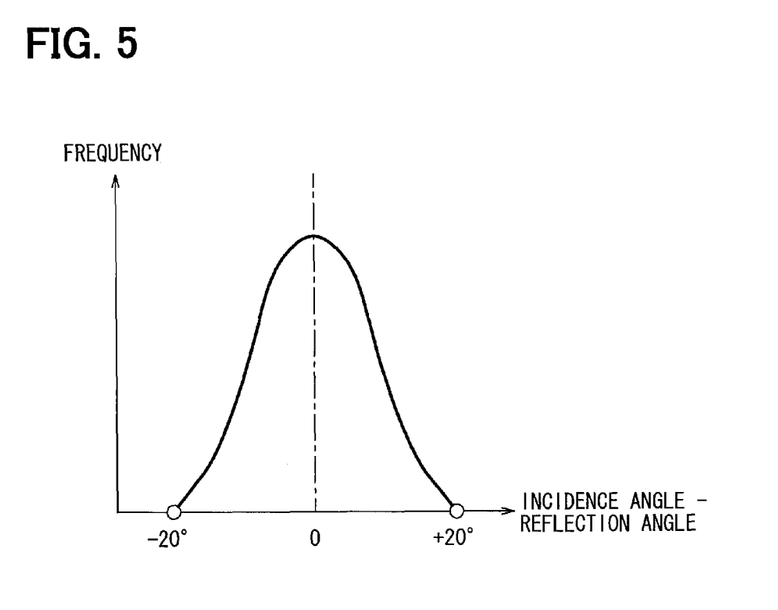
FIG. 5 is a distribution map showing a relation between a frequency and a difference between an incidence angle of dust, which is contained in intake air flowing to an internal combustion engine, relative to a collision surface and a reflection angle of the dust relative to the collision surface, the relation representing a distribution of the difference, according to the first embodiment.

Dust may cause a nonideal collision on the throttle wall surface 16. In the nonideal collision, the absolute value of the difference between the incidence angle and the reflection angle is less than or equal to 20 degrees. Even when dust causes the nonideal collision, in a configuration where each of the angle $\theta 1$ and the $\theta 2$ is greater than or equal to 110 degrees in the specific region 22, the rate of dust reentering into the throttle 15 relative to entire dust causing the nonideal collision can be significantly reduced. In a configuration where the airflow measuring device 1 is equipped in the air intake passage 2 of the internal combustion engine to measure the intake air amount, the difference between the incidence angle of dust and the reflection angle of dust relative to the throttle wall surface 16 is substantially within the range of ±20 degrees. More specifically, as shown in FIG. 5, the difference between the incidence angle and the reflection angle is within the three-sigma normal distribution between ±20 degrees. Thus, reentrance of dust can be effectively restricted.

Therefore, the sensor 5 can be reliably protected from damage due to collision with dust in the airflow measuring device 1. In addition, the second reference vector 21 is substantially in parallel with the insertion direction of the airflow measuring device 1. Therefore, installation of the case 4 in the air intake passage 2 and setting of the specific region 22 can be facilitated.

(Second Embodiment)

Figure 6:
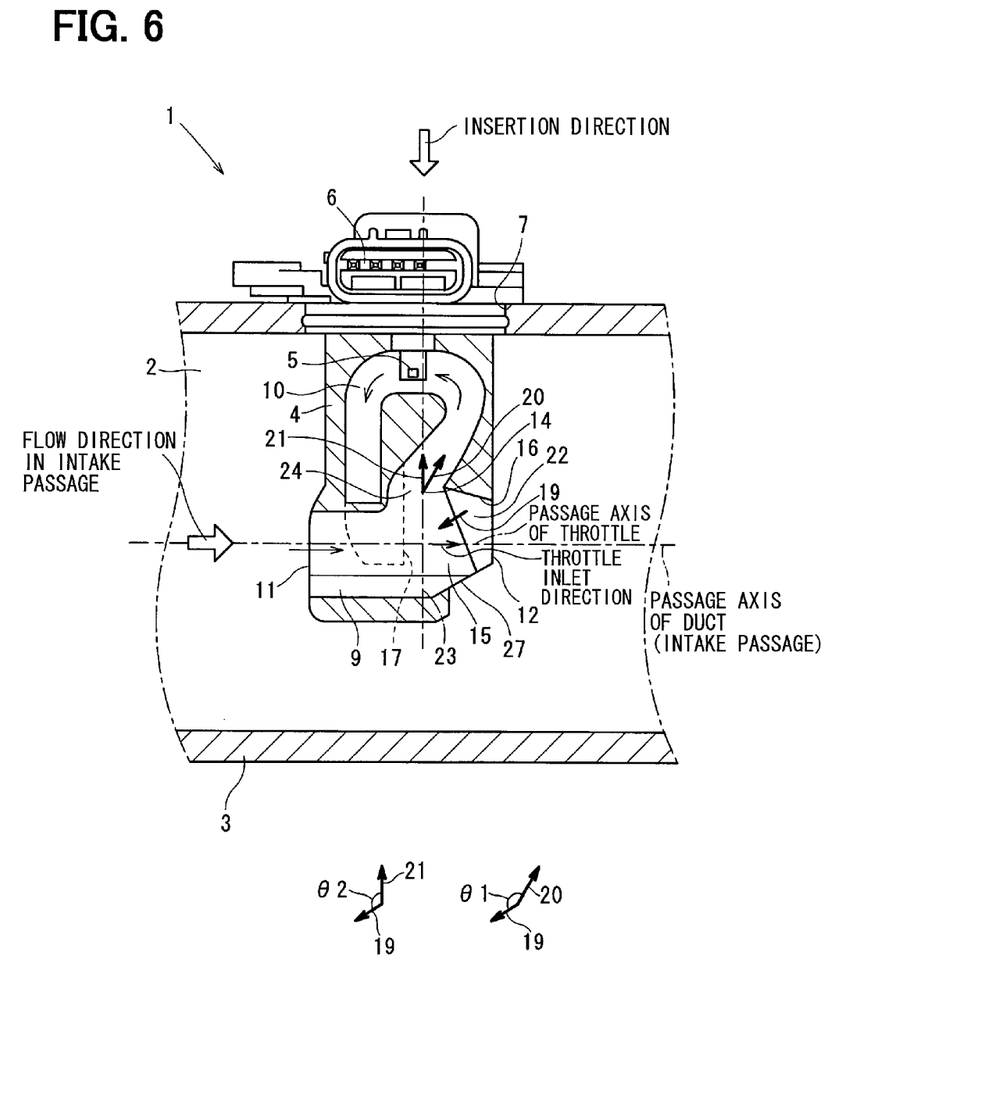
FIG. 6 is a schematic sectional view showing an airflow measuring device taken along the width-direction definition plane, according to a second embodiment.

The airflow measuring device 1 according to the second embodiment will be described with reference to FIG. 6. As shown in FIG. 6, the case 4 has an opening 27 on the opposite side of the branch port 24 through the throttle 15. The opening 27 communicates the throttle 15 with the air intake passage 2. The opening 27 is formed by removing a portion of the throttle wall surface 16, which is located on the opposite side from the branch port 24, from the brim of the first exhaust port 12 toward the upstream. With the present configuration, dust colliding against the specific region 22 can be easily discharged to the air intake passage 2 on the opposite side from the branch port 24. Thus, the sensor 5 can be reliably protected from damage due to collision with dust.

(Third Embodiment)

The configuration of the airflow measuring device 1 according to the third embodiment will be described with reference to FIGS. 7 to 10. The first passage 9 curves in an arc form. The second passage 10 branches radially outward from the arc-formed first passage 9. The specific region 22 continually extends in the throttle wall surface 16 from the brim of the first exhaust port 12 to the upstream side. The specific region 22 extends in the throttle wall surface 16 to an intermediate point between the brim of the first exhaust port 12 and the brim of the branch port 24 of the second passage 10. That is, the specific region 22 does not reach the brim of the branch port 24.

Figure 7:
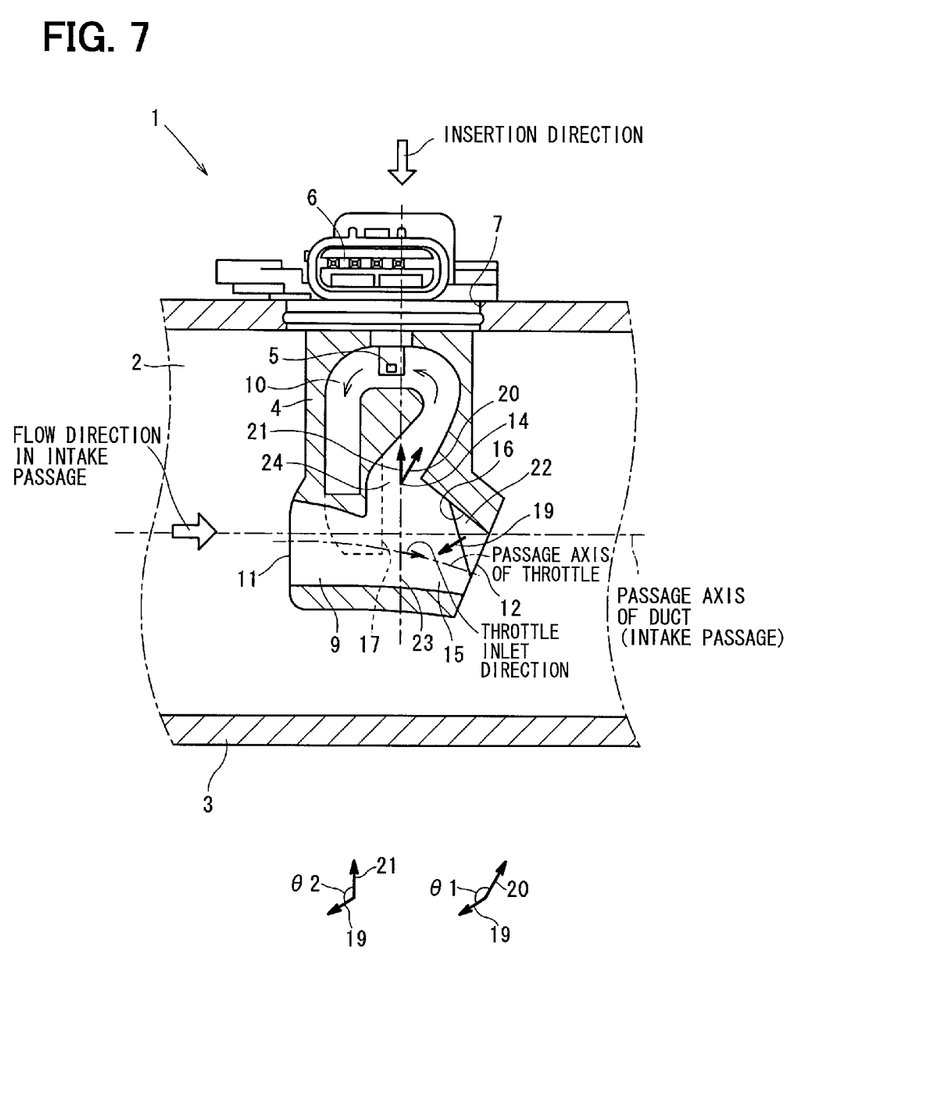
FIG. 7 is a schematic sectional view showing an airflow measuring device taken along the width-direction definition plane, according to a third embodiment.
Figure 8:
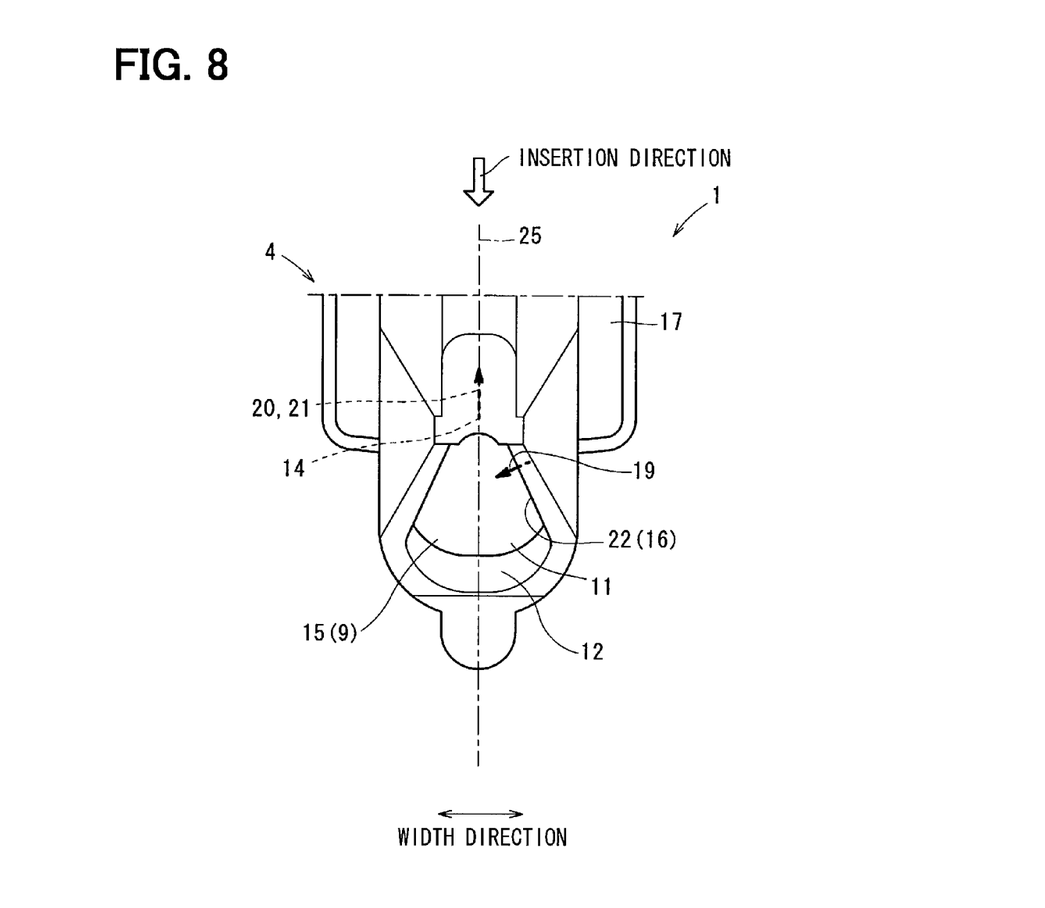
FIG. 8 is a schematic rear view showing the airflow measuring device according to the third embodiment.
Figure 9:
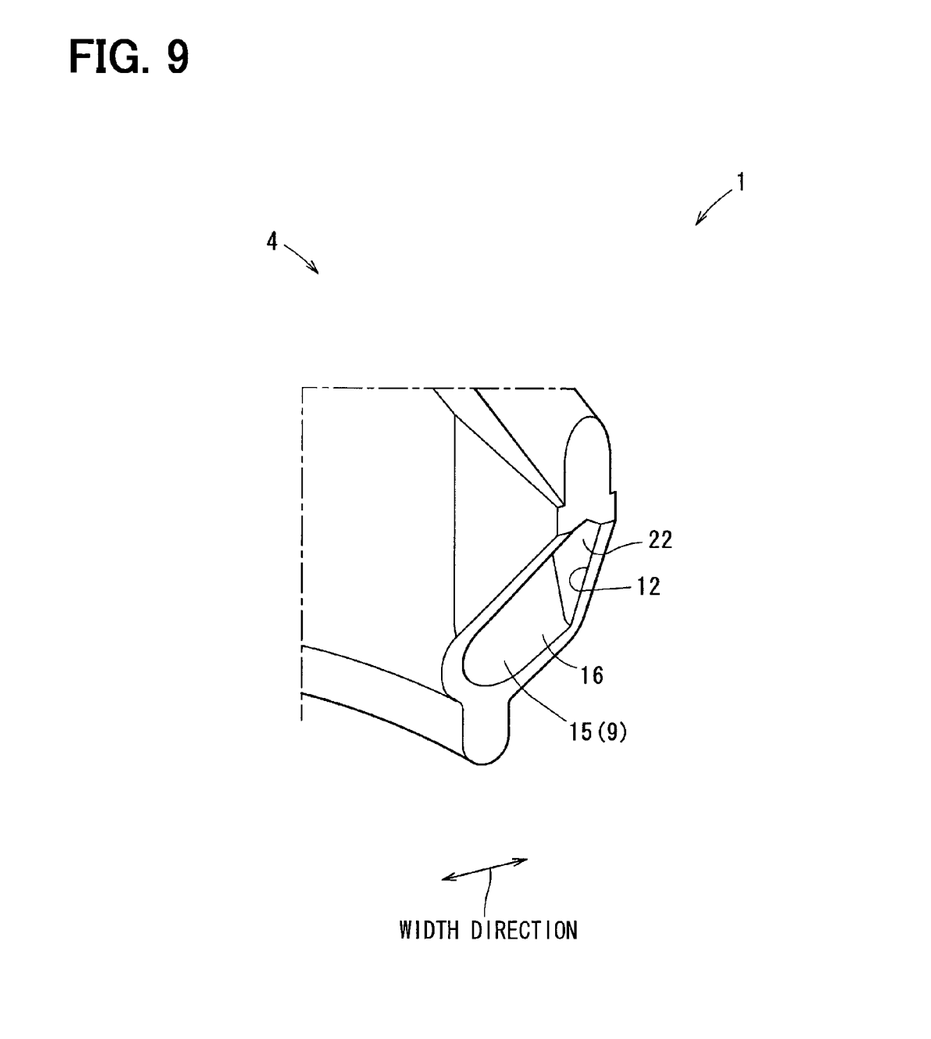
FIG. 9 is a partial perspective view showing a first exhaust port of the flow measuring device according to the third embodiment.
Figure 10:
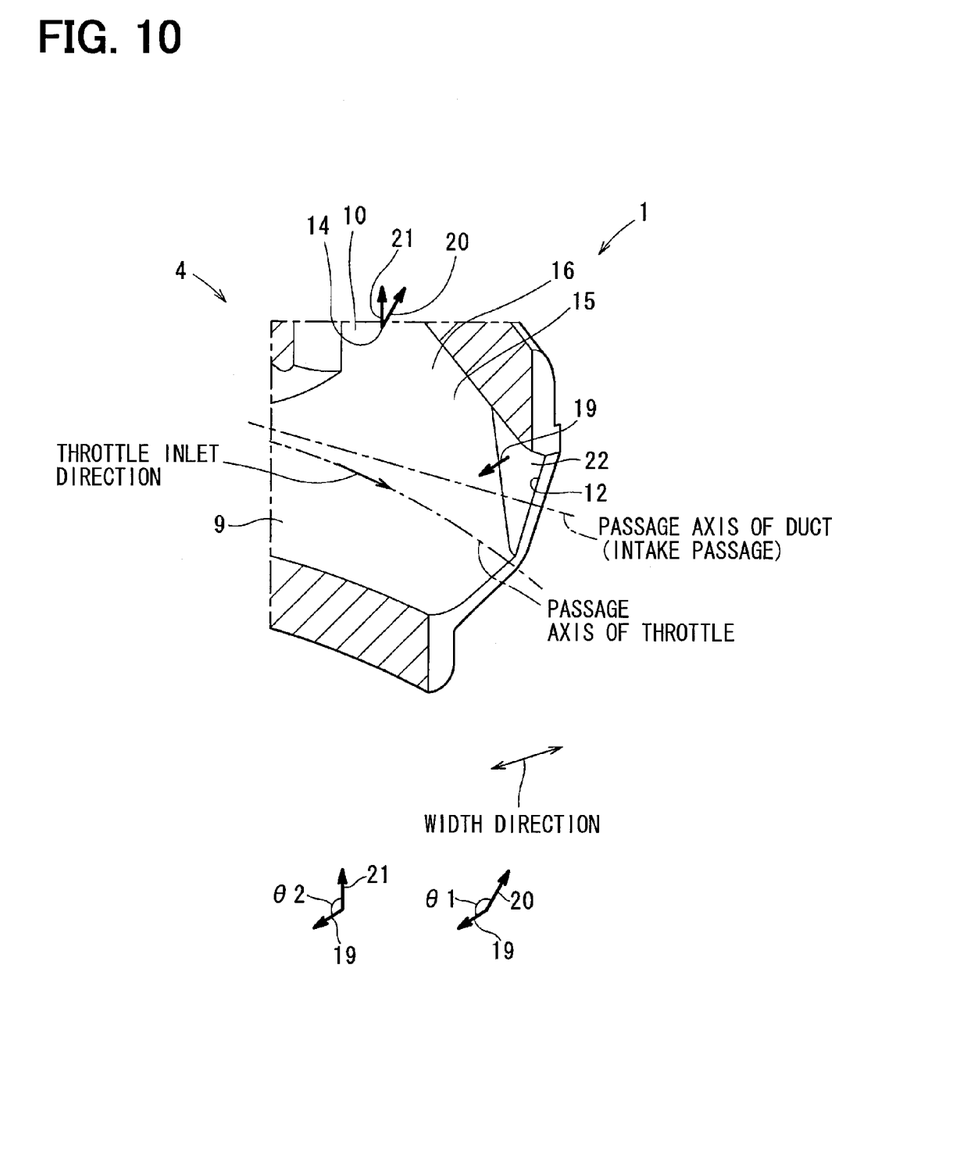
FIG. 10 is a perspective sectional view showing the inside of a throttle of the airflow measuring device taken along the width-direction definition plane, according to the third embodiment.

The throttle wall surface 16 has an upper portion in FIG. 7 on the side of the branch port 24 and a lower portion in FIG. 7 on the opposite side from the branch port 24. The upper portion of the throttle wall surface 16 forms the upper portion of the brim of the first exhaust port 12. The lower portion of the throttle wall surface 16 forms the lower portion of the brim of the first exhaust port 12. The upper portion of the throttle wall surface 16 is projected to the downstream side relative to the lower portion of the throttle wall surface 16. With the present configuration, the plane defined by the brim of the first exhaust port 12 is not perpendicular to the flow direction of intake air in the air intake passage 2, which is shown by the dashed line in FIG. 7. Consequently, the first exhaust port 12 directed downward in FIG. 7 has a configuration, which is similar to the configuration in which the portion of the first exhaust port 12 on the opposite side from the branch port 24 is removed from the brim of the first exhaust port 12 to the upstream side. That is, the configuration of third embodiment is similar to that of the second embodiment. Accordingly, the configuration of the third embodiment produces an operation effect similar to the additional operation effect of the second embodiment.

(Modification)

The configuration of the airflow measuring device 1 is not limited to those in the first to third embodiments, and various modifications of the airflow measuring device 1 may be conceivable. In the airflow measuring device 1 according to the first to third embodiments, the specific region 22 is defined, such that both the angle θ1 and θ2 are in the following relations of 90 degrees<θ1<180 degrees and 90 degrees<θ2<180 degrees. It is noted that, the specific region 22 may be defined such that one of the angle θ1 and the θ2 is greater than 90 degrees and less than 180 degrees. Similarly, the specific region 22 may be defined such that one of the angle θ1 and the θ2 is greater than 110 degrees and less than 180 degrees.

In the airflow measuring device 1 according to the first to third embodiments, only the second reference vector 21 is substantially in parallel with the insertion direction of the airflow measuring device 1. It is noted that, only the first reference vector 20 may be substantially in parallel with the insertion direction. Alternatively, the first and second passages 9 and 10 may be formed such that the first reference vector 20 may be substantially in parallel with the second reference vector 21. In this case, both the first and second reference vectors 20 and 21 may be in parallel with the insertion direction.

In the airflow measuring device 1 according to the first to third embodiments, the width-direction definition plane 25 is a flat plane substantially in parallel with the throttle inlet direction and both the first and second reference vectors 20 and 21. It is noted that, the width-direction definition plane 25 may be substantially in parallel with the throttle inlet direction and the first reference vector 20. Alternatively, the width-direction definition plane 25 may be substantially in parallel with the throttle inlet direction and the second reference vector 21.

In the airflow measuring device 1 according to the first to third embodiments, the specific region 22 is formed such that the normal vector 19 can be broken down into the three directions including the width direction, the direction, which is in parallel with the passage axis of the air intake passage 2 toward the upstream side, and the direction opposite from the second reference vector 21. Alternatively, the specific region 22 may be formed such that the normal vector 19 can be broken down into three directions including the width direction, the direction, which is in parallel with the passage axis of the air intake passage 2 toward the upstream side, and the direction opposite from the first reference vector 20.

In the airflow measuring device 1 according to the first to third embodiments, the specific region 22 is substantially entirely the flat surface. It is noted that, the specific region 22 may be formed with, for example, only a curved surface. Alternatively, the specific region 22 may be formed with a combination of a curved surface and a flat surface.

As described above, the airflow measuring device may include: the case protruded in the duct and configured to receive a part of air flowing through the duct; and the sensor accommodated in the case, the sensor being configured to conduct heat transfer with air received into the case and to send an electric signal according to a flow amount of air in the duct. The case may have the first passage configured to receive air from the duct and to exhaust the received air into the duct, and the second passage branched from the first passage, the second passage configured to receive air from the first passage and to exhaust the received air into the duct separately from the first passage, the second passage accommodating the sensor. The first passage may have the throttle at the downstream of the branch position where the second passage is branched from the first passage. In this case, the first passage may exhaust air into the duct, while throttling the air at the throttle.

The throttle may have the throttle wall surface having sections (points) each having the normal vector directed toward the inside of the throttle. Air may move at the branch position along a flow-direction vector into the second passage. The reference cross section may be one of cross sections perpendicular to the passage axis of the duct and may include the branch position. The reference vector may be the projection vector obtained by vertically projecting the flow-direction vector on the reference cross section. The width direction may be perpendicular to the plane, which is in parallel with both the flow direction of air flowing into the throttle and the reference vector. In this case, the throttle wall surface may have the specific range. In the specific range, the normal vector includes the vector component in the width direction. In the specific range, the angle θ between the normal vector and the reference vector is in the range of 90 degrees<θ<180 degrees.

With the present configuration, even in a case where dust moves into the throttle, the dust hardly reenters the throttle after colliding against the surface in the specific range, irrespective of the collision against the specific range is the ideal collision or the nonideal collision (FIGS. 11A and 11B). Therefore, the rate of dust reentering into the throttle relative to entire dust moving into the throttle can be reduced. Thus, reentrance of dust can be restrained in the airflow measuring device. Consequently, the sensor can be reliably protected from damage caused by collision with dust.

The reference vector may be, instead of the projection vector, the flow-direction vector along which air moves at the branch position into the second passage. The present configuration, in which the reference vector is the flow-direction vector, produces an operation effect similar to the operation effect produced by the configuration in which the reference vector is the projection vector.

The duct may have the insertion hole through which the case is inserted into the duct and protruded. In this case, the case may be linearly inserted through the insertion hole and may be fixed to the duct, such that the inlet port of the first passage for receiving air intersects with the passage axis of the duct. More specifically, the main plane denoted the reference numeral 11 in FIG. 1 and defined by the inlet port of the first passage may intersect with the passage axis of the duct. The reference vector may be substantially in parallel with the insertion direction along which the case is linearly inserted into the duct. With the present configuration, the case and the specific range can be aligned easily relative to the duct.

The angle $\theta$ between the normal vector and the reference vector may be greater than or equal to 110 degrees in the specific range. Dust may cause the nonideal collision, in which the absolute value of the difference between the incidence angle and the reflection angle relative to the throttle wall surface is less than or equal to 20 degrees. With the present configuration, even when dust causes the nonideal collision, the rate of dust reentering into the throttle relative to entire dust causing the nonideal collision can be significantly reduced.

Therefore, the sensor can be reliably protected from damage due to collision with dust in the airflow measuring device. In the present configuration, the airflow measuring device is installed to measure the intake air amount in a duct, which forms the air intake passage extending toward the internal combustion engine. In this case, the difference between the incidence angle of dust and the reflection angle of dust relative to the throttle wall surface is within the three-sigma normal distribution between ±20 degrees. That is, the value, which is multiplication of the standard deviation (sigma) of the difference by three, is substantially within the normal distribution in the range of ±20 degrees. Therefore, the reliability can be significantly enhanced.

An opening may be formed in the throttle on the opposite side from the branch port of the second passage through (across) the passage axis of the throttle, thereby to communicate the throttle with the passage of the duct. With the present configuration, dust colliding against the specific range can be easily discharged into the duct on the opposite side from the branch port. Thus, the sensor can be reliably protected from damage due to collision with dust.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An airflow measuring device comprising:
a case protruded in a duct and configured to receive a part of air flowing through the duct;
a sensor accommodated in the case, the sensor being configured to conduct heat transfer with air received in the case and to send an electric signal according to a flow amount of air in the duct, wherein
the case has
a first passage configured to receive air from the duct and to exhaust air into the duct, and
a second passage branched from the first passage, the second passage configured to receive air from the first passage and to exhaust air into the duct separately from the first passage, the second passage accommodating the sensor,
the first passage has a throttle at a downstream of a branch position where the second passage is branched from the first passage, the first passage is configured to exhaust air into the duct while throttling air at the throttle,
the throttle has a throttle wall surface having a normal vector directed toward an inside of the throttle,
the case has a reference cross section including the branch position, the reference cross section being perpendicular to a passage axis of the duct,
the case is configured to move air along a flow-direction vector into the second passage at the branch position,
the reference cross section includes a reference vector, which is formed by vertically projecting the flow-direction vector on the reference cross section,
a width direction is perpendicular to both a flow direction of air in the throttle and the reference vector, and
the throttle wall surface has a specific region, in which
the normal vector includes a vector component in the width direction, and
an angle $\theta$ between the normal vector and the reference vector is in a range of 90 degrees$<\theta<$180 degrees.

2. The airflow measuring device according to claim 1, wherein
the duct has an insertion hole through which the case is inserted into the duct and protruded into the duct,
the case is linearly inserted through the insertion hole and fixed to the duct, such that an inlet port of the first passage for receiving air intersects with the passage axis of the duct, and
the reference vector is substantially in parallel with an insertion direction along which the case is linearly inserted into the duct.

3. The airflow measuring device according to claim 1, wherein the angle $\theta$ between the normal vector and the reference vector is greater than or equal to 110 degrees in the specific region.

4. The airflow measuring device according to claim 1, wherein
the case has an opening through which the throttle communicates with the duct, and
the opening is located on an opposite side from a branch port of the second passage through a passage axis of the throttle.

5. An airflow measuring device comprising:
a case protruded in a duct and configured to receive a part of air flowing through the duct;
a sensor accommodated in the case, the sensor being configured to conduct heat transfer with air received in the case and to send an electric signal according to a flow amount of air in the duct, wherein
the case has
a first passage configured to receive air from the duct and to exhaust air into the duct, and
a second passage branched from the first passage, the second passage configured to receive air from the first passage and to exhaust air into the duct separately from the first passage, the second passage accommodating the sensor, the first passage has a throttle at a downstream of a branch position where the second passage is branched from the first passage, the first passage is configured to exhaust air into the duct while throttling air at the throttle, the throttle has a throttle wall surface having a normal vector directed toward an inside of the throttle, the case is configured to move air along a reference vector into the second passage at the branch position, a width direction is perpendicular to both a flow direction of air in the throttle and the reference vector, and the throttle wall surface has a specific region, in which
- the normal vector includes a vector component in the width direction, and
- an angle θ between the normal vector and the reference vector is in a range of 90 degrees<θ<180 degrees.

6. The airflow measuring device according to claim 5, wherein the duct has an insertion hole through which the case is inserted into the duct and protruded into the duct, the case is linearly inserted through the insertion hole and fixed to the duct, such that an inlet port of the first passage for receiving air intersects with the passage axis of the duct, and the reference vector is substantially in parallel with an insertion direction along which the case is linearly inserted into the duct.

7. The airflow measuring device according to claim 5, wherein the angle θ between the normal vector and the reference vector is greater than or equal to 110 degrees in the specific region.

8. The airflow measuring device according to claim 5, wherein the case has an opening through which the throttle communicates with the duct, and the opening is located on an opposite side from a branch port of the second passage through a passage axis of the throttle.

* * * * *